Sept. 20, 1966 W. B. KINCAID 3,274,466
VARIABLE CAPACITOR
Filed Oct. 4, 1963 2 Sheets-Sheet 1
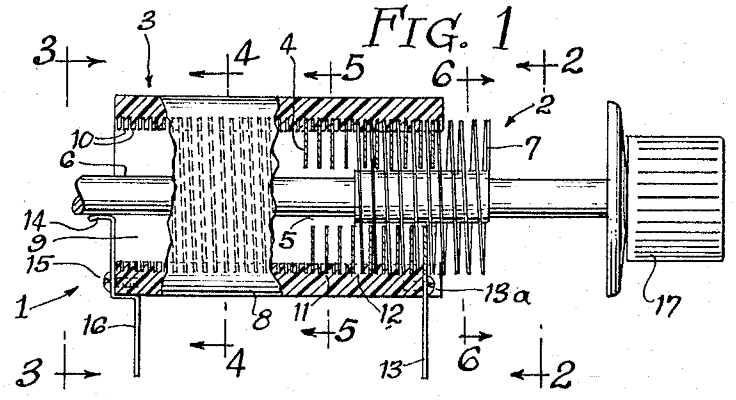
FIG. 2
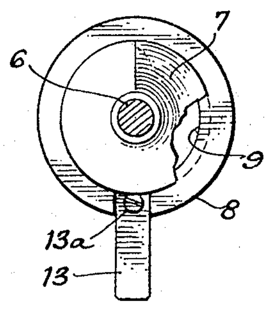
FIG. 3
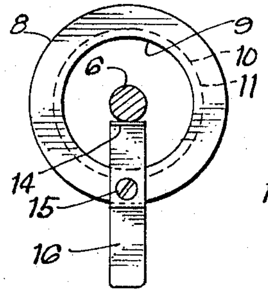
FIG. 4
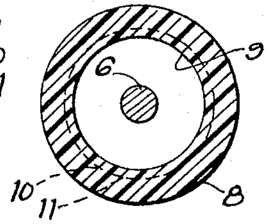
FIG. 5
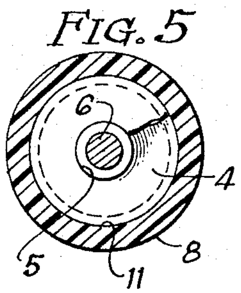
FIG. 6
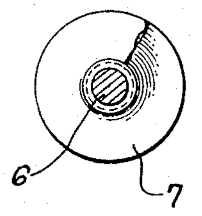
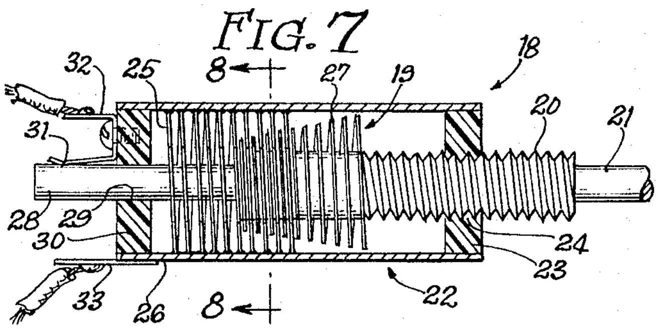
FIG. 8
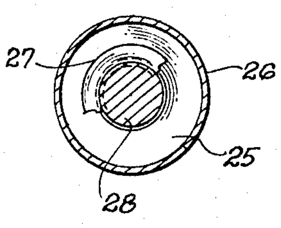
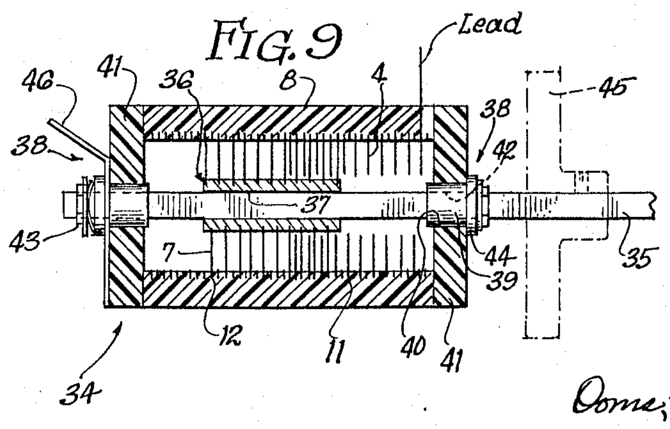
INVENTOR.
William B. Kincaid
BY Dome, McDougall & Hersh
Att'ys Sept. 20, 1966 W. B. KINCAID 3,274,466

VARIABLE CAPACITOR

Filed Oct. 4, 1963 2 Sheets-Sheet 2

INVENTOR.
William B. Kincaid
BY
Ooms, McDougall & Hersh
Att'ys

United States Patent Office 3,274,466
Patented Sept. 20, 1966

3,274,466
VARIABLE CAPACITOR

William B. Kincaid, Nashville, Tenn., assignor to Aladdin Industries, Incorporated, Chicago, Ill., a corporation of Illinois Filed Oct. 4, 1963, Ser. No. 314,031
1 Claim. (Cl. 317—252)

This invention relates to radio, television and other tuners and pertains particularly to variable capacitors.

One object of the present invention is to provide a new and improved tuning device which serves primarily as a variable capacitor at ordinary radio frequencies but is adapted to serve as a tuner in which both the capacitance and the inductance are varied at very high and ultra high frequencies.

Another object is to provide a new and improved variable capacitor which is adapted to be adjusted in an extremely precise and gradual manner.

A further object is to provide a variable capacitor in which the curve of capacitance versus movement may be linear or may be non-linear so as to provide a straight line frequency tuning variation, for example, or any other non-linear type of tuning curve.

Another object is to provide a variable capacitor which gives an extremely wide range of capacitance variation in an unusually compact construction.

It is another object to provide a variable capacitor having meshing radial stator and rotor plates which extend along parallel helixes and are provided with means whereby rotation of the rotor causes axial advancing movement between the rotor and the stator so as to vary the extent to which the rotor and stator plates are meshed.

A further object is to provide a variable capacitor of the foregoing character in which the outer helical edge of the rotor plate is screwed into an internal thread formed in an insulating member on the stator so that rotation of the rotor causes the rotor plate to be advanced along the internal thread.

Further objects and adaptions of the present invention will appear from the following description taken with the accompanying drawings in which:

FIG. 1 is a central longitudinal section of a variable capacitor to be described as an illustrative embodiment of the present invention, the capacitor being shown partially disassembled.

FIG. 2 is an end view taken generally along the line 2—2 in FIG. 1.

FIG. 3 is an opposite end view, taken as indicated by the line 3—3 in FIG. 1.

FIGS. 4, 5 and 6 are cross-sectional views, taken generally along the lines 4—4, 5—5 and 6—6 in FIG. 1.

FIG. 7 is a central longitudinal section showing a modified variable capacitor.

FIG. 8 is a cross-section taken generally along the line 8—8 in FIG. 7.

FIG. 9 is a central longitudinal section showing another modified variable capacitor.

Figure 10:
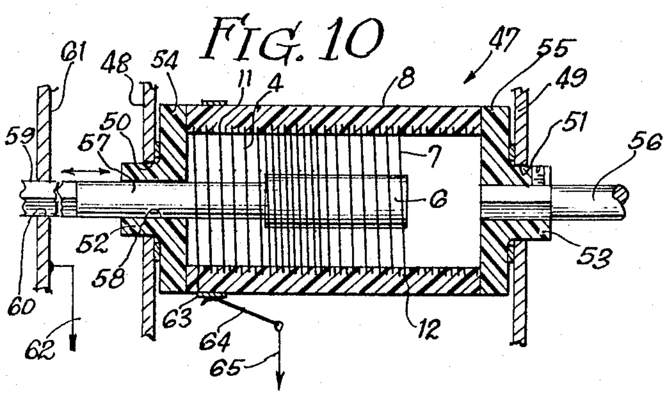
Figure 11:
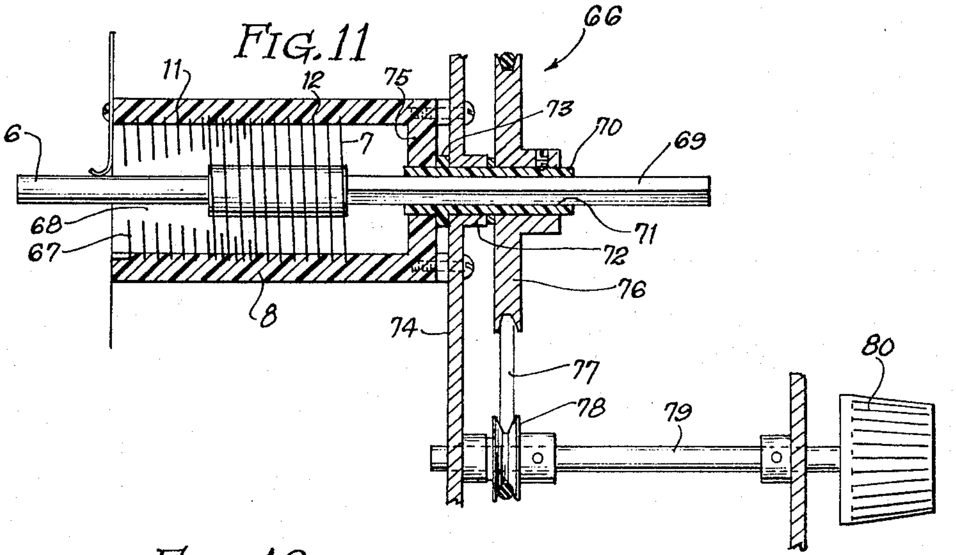
Figure 12:
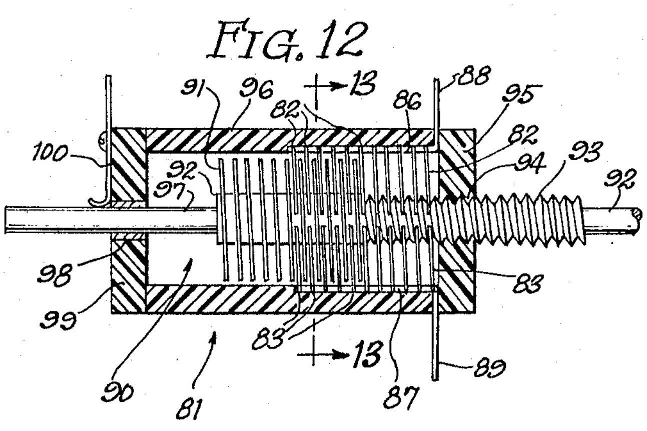

FIGS. 10, 11 and 12 are central longitudinal sections showing three additional modified constructions.

Figure 13:
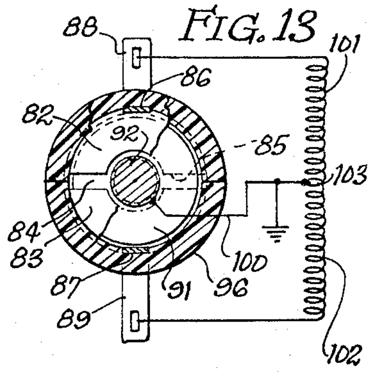

FIG. 13 is a diagramatic cross-section taken generally along the line 13—13 in FIG. 12.

As already indicated, FIG. 1 illustrates a variable capacitor or tuner I which is for use in radio, television, or other similar equipment. The illustrated capacitor I comprises a rotor 2 and a stator 3. It will be seen that the stator 3 comprises a radial plate or electrode 4 which is in the shape of a helix or spiral. The helical plate 4 may extend through any desired number of turns around the axis of the helix. The plate 4 is formed with an axial opening 5. Thus, as seen in the cross-sectional view of FIG. 5, both the inner and the outer outlines of the plate 4 are circular.

The illustrated rotor 2 is provided with an axial shaft 6 which extends through the opening 5 and is spaced from the stator plate 4. A rotor plate 7 is mounted on the shaft 6. It will be seen that the rotor plate 7 is similar in shape to the stator plate 4. Thus, the rotor plate 7 projects radially from the shaft 6 and extends along a second helix. The rotor plate 7 is parallel to but spaced from the stator plate 4.

Screw means are provided to cause the rotor 2 to travel axially relative to the stator 3 when the rotor is rotated relative to the stator. In the embodiment of FIG. 1, such screw means are provided by a cylinder or tube 8 which is made of insulating material and constitutes one portion of the stator 3. The cylinder 8 is formed with an axial bore 9 in which the stator plate 4 is mounted. Parallel double screw threads 10 are formed on the inside of the bore 9. As in the case of the usual double threads, the convolutions of one of the double threads are midway between the convolutions of the other thread. It will be understood that two parallel helical grooves 11 and 12 are formed between the double screw threads 10. The grooves 11 and 12 are independent of each other. The convolutions of the groove 12 are spaced midway between the convolutions of the groove 11.

In this case, the helical stator plate 4 is screwed into the first helical groove 11. In this way, the stator plate is precisely and securely positioned and supported within the insulating cylinder or sleeve 8. The helical rotor plate 7 is screwed into the second helical groove 12. By rotating the rotor shaft 6, the rotor plate 7 may be screwed along the helical groove 12. In this way, it is easy to vary the extent to which the rotor plate 7 is meshed with the stator plate 4.

It will be understood that the stator and rotor plates 4 and 7 are conductive and preferably are made of metal. A conductive terminal tab or lug 13 may be connected to any desired portion of the stator plate 4. As shown, the terminal tab 13 extends radially from one end of the stator plate 4 and is secured to the insulating cylinder 8 by a screw or other fastener 14.

A conductive wiper or brush 14 may be employed to establish an electrical connection to the rotor plate 7. As shown, the wiper 14 is in the form of a strip of spring metal which presses against the rotor shaft 6 and is secured to the insulating cylinder 8 by a screw 15 or the like. A terminal tab or lug 16 is connected to the wiper 14 and extends radially from the cylinder 8. The shaft 6 is conductive and provides the electrical connection between the wiper 14 and the rotor plate 7.

Any suitable means may be provided to drive the rotor shaft 6. As shown in FIG. 1, one end of the shaft 6 is simply fitted with a control knob 17 which may be rotated manually. The lugs 13 and 16 constitute the terminals of the variable capacitor. It is preferred to ground the lug 16 so that the rotor shaft 6 will be grounded. When the stator and rotor plates 4 and 7 are meshed to the greatest possible extent, the capacitance between the plates will be at a maximum. The capacitance may be reduced by screwing the rotor plate 7 along the helical groove 12, so as to decrease the extent to which the rotor plate 7 is meshed with the stator plate. The variable capacitor is capable of providing an extremely wide range of capacitance variation in an unusually compact construction. Moreover, the variations in the capacitance is extremely gradual and precise. The capacitance variation is spread over many rotations of the rotor 2.

At ordinary radio frequencies, the tuner 1 serves primarily as a variable capacitor. At such frequencies, the small inductance presented by the tuner is an inconsequential factor. However, at very high and ultra high radio frequencies, the inductance becomes a significant factor so that the tuner becomes a combination variable capacitor and variable inductor. The inductance of the tuner is contributed primarily by the stator plate 4, although some inductance is also contributed by the rotor. The inductance of the stator plate 4 is in series with the capacitance between the rotor and the stator plate. When the stator and rotor plates 4 and 7 are fully meshed, the inductance is at a minimum and the capacitance is at a maximum. As the rotor is unmeshed from the stator plate 4, the inductance increases, while the capacitance decreases.

In the embodiment of FIG. 1, the rotor plate 7 serves as the external screw thread whereby the rotor is caused to travel axially when it is rotated. FIG. 7 illustrates a modified embodiment 18 having a rotor 19 which is advanced by an external screw thread 20 on the rotor shaft 21. The tuner 18 has a stator 22 which includes an insulating end plate or disc 23 which is formed with an internal screw thread 24 meshed with the external thread 23. As before, the stator 22 has a radial helical plate 25. However, in this case, the stator plate 25 is mounted inside a conductive metal sleeve or cylinder 26. The outer edges of the plate 25 may be soldered or otherwise secured to the inside of the cylinder 26.

The rotor 19 also has a radial helical plate 27 which is mounted on the rotor shaft 21. By turning the shaft 21, the rotor plate 27 may be moved into mesh with the stator plate 25. It will be understood that the rotor plate 27 is parallel to but spaced from the stator plate 25. The pitch of the screw 20 is the same as the pitch of the plates 25 and 27 so that the convolutions of the rotor plate 27 will be maintained midway between the convolutions of the stator plate 25.

As shown, the rotor shaft 21 has a rear portion 28 which is slidably guided in an axial bore 29 formed in an insulating disc 30. The discs 23 and 30 may be secured to the opposite ends of the cylinder 26 on the stator 22.

A wiper 31 engages the rear shaft portion 28 to provide an electrical connection to the rotor plate 27. A terminal lug 32 is connected to the wiper 31. The other terminal of the tuner is provided by a lug 33 connected to the cylinder 26.

The construction of FIG. 7 minimizes the distributed inductance of the tuner, because all of the convolutions of the stator plate 25 are connected direct to the cylinder 26. Moreover, all of the convolutions of the rotor plate 27 are connected to the rotor shaft 21. Thus, the tuner serves primarily as a variable capacitor, even at rather high radio frequencies.

The embodiment of FIG. 1 provides a variation of capacitance which is substantially linear, when plotted against the rotation or movement of the rotor. This linear variation results from the circular shape of both the stator and the rotor plates. By tapering or otherwise varying the shape of the stator or rotor plates, various non-linear tuning curves may be obtained. FIG. 7 illustrates one such construction in that the rotor plate 27 is tapered in its outside diameter from one end to the other. Thus, the change in capacitances is less pronounced for one portion of the range of the rotor than it is for another portion. It will be understood that a similar effect may be achieved by tapering the inside diameter of the stator plate. By thus tapering the rotor or stator plates, or both plates, it is readily possible to achieve a straight line frequency tuning curve, which is desirable for many applications.

FIG. 9 illustrates a variable capacitor 34 which is very similar to the capacitor 1 of FIG. 1, but is provided with a more elaborate drive, whereby the rotor shaft 35 is prevented from traveling axially when it is rotated. The illustrated rotor shaft 35 is square in cross-section, but it may be of any desired non-circular shape. Instead of being mounted directly on the rotor shaft, the rotor plate 7 is mounted on a sleeve or hub 36 which slides along the shaft 35. Thus, the sleeve 36 is formed with a square axial opening 37 through which the shaft 35 extends.

By means of a pair of bearings 38, the shaft 35 is supported for rotation while being restrained against axial movements. Each bearing may comprise a bushing 39 which is rotatable in a bore 40 formed in an end plate 41. Each bushing 39 is formed with a square opening 42 so that the bushing will rotate with the shaft 35. Collars 43 are secured to the shaft 35 to prevent axial movement of the shaft relative to the bushings 39. Each bushing has an enlarged end portion 44 which engages the corresponding end plate 41 to prevent axial movement of the bushing.

A drive pulley or gear 45 may be mounted on the shaft 35, or the shaft may be connected directly to a knob as in the case of FIG. 1. In any event the shaft rotates but does not travel endwise. The engagement of the helical rotor plate 7 with the helical groove 12 causes the rotor plate to travel endwise along the shaft 35 when the shaft is rotated.

The bushings 39 may be conductive for establishing an electrical connection to the rotor plate 7. One of the bushings 39 may be engaged with a terminal strip 46.

FIG. 10 illustrates a modified variable capacitor 47 which is similar to the one illustrated in FIG. 1, except that the helical plate 4 and the supporting cylinder 8 are rotated, while the helical plate 7 and the shaft 6 are prevented from rotating. Thus, the stator becomes the rotor, while the rotor becomes the stator. The cylinder 8 is prevented from traveling endwise by being confined between stationary bearing plates or walls 48 and 49. Bores 50 and 51 are formed in the plates 48 and 49 for rotatably supporting hubs 52 and 53 which are formed on end plates 54 and 55 secured to the cylinder 8. For use in rotating the cylinder 8, a control shaft 56 is mounted axially in the hub 53.

The shaft 6 has a portion 57 which is rotatably received in a bore 58 formed in the hub 52. To prevent the shaft 6 and the helical plate 7 from rotating, the shaft 6 is formed with a portion 59 which is shown as being square, but may be of any suitable non-circular shape. The square portion 59 is guided in a square hole 60 formed in a stationary plate 61.

An electrical terminal 62 may also be connected to the plate 61 to establish a connection to the helical plate 7. The plate 4 is connected to a slip ring 63 on the outside of the cylinder 8. A brush or wiper 64 engages the slip ring 63 and is connected to a terminal 65. It will be understood that in any of the embodiments, either of the helical plates may be rotated, while the other is held against rotation.

FIG. 11 illustrates still another embodiment 66 which is similar to the embodiment of FIG. 1, but is provided with a helical stator plate 67 having an opening 68 therein which tapers in diameter to provide a non-linear variation of capacitance, as already discussed in connection with FIG. 7. By way of further modification, the rotor shaft 6 is formed with a front portion 69 which is shown as being square, but may be of some other suitable non-circular shape. A bushing 70 is slidably mounted on the square shaft 69 and is formed with a square opening 71. The bushing 70 is rotatably mounted in a bearing 72. Axial movement of the bushing 72 is prevented by providing a flange 73 on the bushing and confining the flange between a mounting plate 74 and an end wall 75 which is secured to the insulating cylinder 8.

To provide for driving the shaft 69, a pulley or gear 76 may be mounted on the bushing 70. As shown, a drive belt 77 is employed to connect the pulley 76 to another pulley 78 secured to a rotatable shaft 79. A control knob 80 may be secured to the shaft 79.

FIGS. 12 and 13 illustrate another modified variable capacitor 81 having a split stator construction to provide two sets of stator plates 82 and 83. As shown in FIG.

13, radial slots 84 and 85 are provided between the two sets of plates 82 and 83. If desired, the stator could be split into more than two sets of plates. All of the plates 82 and 83 extend along a single helix, as in the case of the other variable capacitors. Separate terminal bars 86 and 87 are connected to all of the stator plates 82 and 83, respectively. Terminal lugs 88 and 89 are brought out radially from the bars 86 and 87.

As in the previously described constructions, the variable capacitor 81 of FIG. 12 has a rotor 90 which comprises a single radially helical plate 91 mounted on an axial rotor shaft 92. The helical plate 91 is movable progressively into mesh with the stator plates 82 and 83. As in the construction of FIG. 7, the rotor shaft 92 is formed with an external screw thread 93 which is screwed into an internal thread 94 formed in an end wall 95 on the insulating cylinder 96 which supports the stator plates 82 and 83. Thus, rotating the rotor shaft 92 causes the rotor plate 91 to travel axially.

At its other end, the rotor shaft 92 has a portion 97 which is rotatably and slidably supported by a bearing 98 mounted in an end wall 99 on the cylinder 96. A terminal wiper 100 engages the shaft portion 97.

As indicated diagrammatically in FIG. 13, the split stator construction is especially suitable for use in split or balanced tuning circuits. Thus, a pair of balanced coils 101 and 102 may be connected between the stator terminals 88 and 89. The mid point or center tap 103 between the coils 101 and 102 may be connected to the rotor terminal 100, which may be grounded.

It will be evident that the variable capacitors of the present invention are versatile and are susceptible of many variations in construction to meet various needs. The helical plates of the capacitors result in precise and gradual tuning and make it possible to provide a wide range of variation in capacitance.

The capacitors of the present invention provide high values of capacitance while occupying an unusually small amount of space. The manufacturing cost of the variable capacitors is extremely low.

The capacitors of this invention can be completely shielded and can readily be hermetically sealed. Thus, shielding can be provided in the construction of FIG. 7 by using the outer cylinder 26 as a shield, in which case the outer cylinder should preferably be grounded. The threaded portion 20 and the front portion 21 of the rotor shaft may be made of insulating material. Any of the other disclosed embodiments may readily be shielded by providing a grounded outer housing.

The capacitors of the present invention are not appreciably affected by shock or extreme acceleration because the center of gravity of the rotor is along the axis thereof and remains constant in position when the rotor is rotated. Thus, acceleration does not tend to change the position of the rotor.

The embodiment of FIGS. 12 and 13 illustrates one construction in which one of the helical plates is split into a plurality of sections. The other helical plate may also be split into sections.

Multiple or ganged units may be provided having a plurality of capacitor sections arranged end to end and operated by a common shaft. In some cases a single rotor section may be adapted to mesh with a plurality of stator sections arranged end to end. Various other sectionalized constructions may be employed.

Various other modifications, alternative constructions and equivalents may be employed without departing from the true spirit and scope of the invention, as exemplified in the foregoing description and defined in the following claim.

I claim:

In a variable capacitor, the combination comprising a supporting cylinder made of insulating material and having an axial bore therein, said cylinder being formed with double internal screw threads extending along the inside of said bore, said double threads providing first and second parallel internal helical grooves along said bore, a conductive helical radial stator plate having its outer edge received and supported in said first helical groove, said stator plate having an axial opening therein, a rotor having an axial shaft extending through said opening, a conductive radial helical rotor plate secured to said shaft and having its outer edge received in said second helical groove, said shaft and said rotor plate being rotatable to move said rotor plate along said second helical groove to vary the extent to which said rotor plate meshes with said stator plate, said shaft and said rotor plate being spaced from said stator plate, a drive member having a non-circular opening therein, said shaft having a correspondingly non-circular drive portion slidably received within said non-circular opening, and means supporting said drive member for rotation while restraining axial movement thereof, said stator plate being tapered in radial width along the length thereof.

References Cited by the Examiner

UNITED STATES PATENTS

| | | | |
|---|---|---|---|
| 1,508,590 | 9/1924 | Boykin | 64—23.7 |
| 1,538,487 | 5/1925 | Meirowsky | 317—252 |
| 1,737,074 | 11/1929 | Brand | 317—252 |
| 2,346,958 | 4/1944 | Abegg | 64—23.7 |
| 2,698,405 | 12/1954 | True | 317—253 |

FOREIGN PATENTS

| | | |
|---|---|---|
| 1,145,724 | 3/1963 | Germany. |
| 425,329 | 3/1935 | Great Britain. |
| 733,703 | 7/1955 | Great Britain. |

LEWIS H. MYERS, *Primary Examiner.*

JOHN F. BURNS, ROBERT K. SCHAEFER, *Examiners.*

E. GOLDBERG, *Assistant Examiner.*